United States Patent [19]

Chapman

[11] Patent Number: 5,423,669
[45] Date of Patent: Jun. 13, 1995

[54] APPARATUS FOR THERMOFORMING SHAPED ARTICLES

[76] Inventor: Michael Chapman, 480 Wapping Rd., Portsmouth, R.I. 02871

[21] Appl. No.: 109,311

[22] Filed: Aug. 19, 1993

[51] Int. Cl.⁶ .................. B29C 51/42; B29C 51/46
[52] U.S. Cl. .......................... 425/143; 264/25; 264/40.1; 264/322; 425/174.4; 425/384
[58] Field of Search ........... 425/384, 407, 143, 174.4; 264/40.1, 25, 322

[56] References Cited

U.S. PATENT DOCUMENTS

| | | | |
|---|---|---|---|
| 3,476,840 | 11/1969 | Glassford | 425/384 |
| 3,568,253 | 3/1971 | Schwartz et al. | 425/143 |
| 3,585,689 | 6/1971 | Brown et al. | 425/143 |
| 3,784,353 | 1/1974 | Chapurin | 431/329 |
| 3,950,480 | 4/1976 | Adams et al. | 264/284 |
| 4,009,981 | 3/1977 | Rosen | 425/384 |
| 4,462,786 | 7/1984 | Perryman | 425/143 |
| 4,933,126 | 6/1990 | Shuman | 425/143 |
| 5,263,839 | 11/1993 | Robinson et al. | 425/143 |

*Primary Examiner*—Jay H. Woo
*Assistant Examiner*—Duane S. Smith
*Attorney, Agent, or Firm*—John R. Doherty

[57] ABSTRACT

A gas fed catalytic heater is employed as a heat source in the thermoforming of shaped articles from a sheet of thermoplastic material. The thermoplastic sheet is fed from a continuous supply roll past an array of gas catalytic heaters in a heating section in order to soften the sheet prior to entering a mold for shaping the articles. A closed loop temperature control system is provided for controlling the pressure and hence the volume of gas entering the catalytic heaters and thus the emitted infrared radiation to automatically maintain the temperature of the thermoplastic sheet at a predetermined set value. The control system includes a temperature sensor for measuring the temperature of the sheet, a temperature controller for comparing the actual temperature of the sheet against a preset temperature and for producing an output signal that is proportional to the difference temperature and a gas modulating valve which is responsive to the output signal for adjusting the flow of gas to the catalytic heaters.

15 Claims, 5 Drawing Sheets

APPARATUS FOR THERMOFORMING SHAPED ARTICLES

BACKGROUND OF THE INVENTION

This invention relates to the thermoforming of shaped articles and, more particularly, to an improved apparatus for thermoforming shaped articles using a gas fed catalytic heater as a heat source.

Shaped plastic articles such as plastic drinking cups, party plates, video jackets and the like are commonly made by a thermoforming process wherein a sheet of thermoplastic material is heated to its softening point and then shaped in a mold to form the desired articles. Typically, the sheet of thermoplastic material is fed from a continuous supply roll through a heating zone and thence onto to the mold where the articles are formed, the process being commonly referred to in the industry as a "Roll Fed In-Line Thermoforming Process".

Heretofore, electric infrared devices have been employed in the thermoforming process to heat the sheet of thermoplastic material as it is being fed from the supply roll to the mold. The infrared heaters have been controlled by means of percentage timers which turn the heaters on for a percentage of the time and then off for the remainder. The operator of the equipment must frequently adjust the percentage timers to offset the effects of convected heat and thus produce acceptable molded parts. The ratio of infrared to convected heat produced by these devices is typically on the order of about 50/50. Because of this rather large ratio and the uncertain effects of convective heat on the heating of the thermoplastic sheet, attempts to automatically control the temperature of the sheets to a predetermined value have not been successful. It has been proposed, for example, to employ a closed loop temperature control system for sensing the temperature of the sheet and then controlling the temperature by regulating the power input to the electric heaters but the results have been highly erratic. Since the sheet is being heated by both infrared and convective heat, it is difficult, if not impossible, to determine which source is predominant in the heating of the plastic material.

Another problem with electric infrared heaters is that they emit short wave infrared energy, that is, infrared radiation having a wave length of from about 1.0 to about 3.0 microns. Unfortunately, most plastic materials do not readily absorb short wave infrared radiation.

Another serious problem is that electric infrared heaters operate at fairly high temperatures and will ignite most flammable materials upon contact. This is particularly troublesome in the operation of roll fed in-line thermoforming equipment wherein occasionally stray pieces of flammable thermoplastic sheet inadvertently contact the surface of the heaters creating a serious fire hazards.

It is therefore an important object of the invention to provide an improved apparatus for thermoforming shaped articles from a sheet of thermoplastic material.

Another object of the invention is to provide an improved thermoforming apparatus which utilizes as a heat source an infrared heating device which produces only minimal amounts of convective heat.

Still another object of the invention is to provide such an improved thermoforming apparatus employing a closed loop temperature control system.

A more specific object of the invention is to provide such an improved thermoforming apparatus utilizing an infrared heating device emitting infrared energy which is readily absorbed by most plastic materials.

Still another specific object of the invention is to provide such an improved thermoforming apparatus utilizing an infrared heating device which operates at relative low temperatures and which is flameless and safe.

SUMMARY OF THE INVENTION

Broadly, the invention is directed to an improved apparatus for thermoforming shaped articles from a sheet of thermoplastic material using a gas fed catalytic heater as an infrared heat source. The gas fed catalytic heaters used in the thermoforming process according to the invention operate at relatively low temperatures and are flameless and safe to use in most environments. They produce mostly infrared heat and develop very little convected heat so that the thermoforming process can be more effectively carried out using a closed loop temperature control system. Moreover, gas fed catalytic heaters emit long wave infrared radiation having a wave length which matches the infrared absorption of most thermoplastic materials. The heat radiated from the catalytic heaters is thus absorbed quickly and uniformly throughout the thickness of the thermoplastic sheet.

Gas fed catalytic heaters are most advantageously employed as a heat source in conventional roll fed in-line thermoforming processes according to the invention. The sheet of thermoplastic material is fed from a continuous supply roll longitudinally along an elongated track via a chain drive mechanism or the like passed an array of gas catalytic heaters in a heating zone in order to soften the sheet prior to entering the mold.

A closed loop temperature control system is provided according to the invention for controlling the volume of gas entering the catalytic heaters and thus the emitted infrared radiation to automatically maintain the temperature of the thermoplastic sheet at a predetermined set value. The control system includes a temperature sensor for sensing the temperature of the sheet, a temperature controller for comparing the actual temperature of the sheet against a predetermined or preselected temperature and for producing am output signal that is proportional to the difference temperature and a gas control or modulating valve which is responsive to the output signal for adjusting the flow of gas to the array of catalytic heaters.

Optionally, a blower or similar device may be installed preferably upstream from the array of catalytic heaters for introducing a stream of air between the heaters and the thermoplastic sheet that adds oxygen for the catalytic reaction as well as to remove convective heat that may be developed by the heaters.

BRIEF DESCRIPTION OF THE DRAWINGS

The invention will now be described in greater detail with particular reference to the accompanying drawings wherein.

DESCRIPTION OF THE PREFERRED EMBODIMENTS

Figure 1:
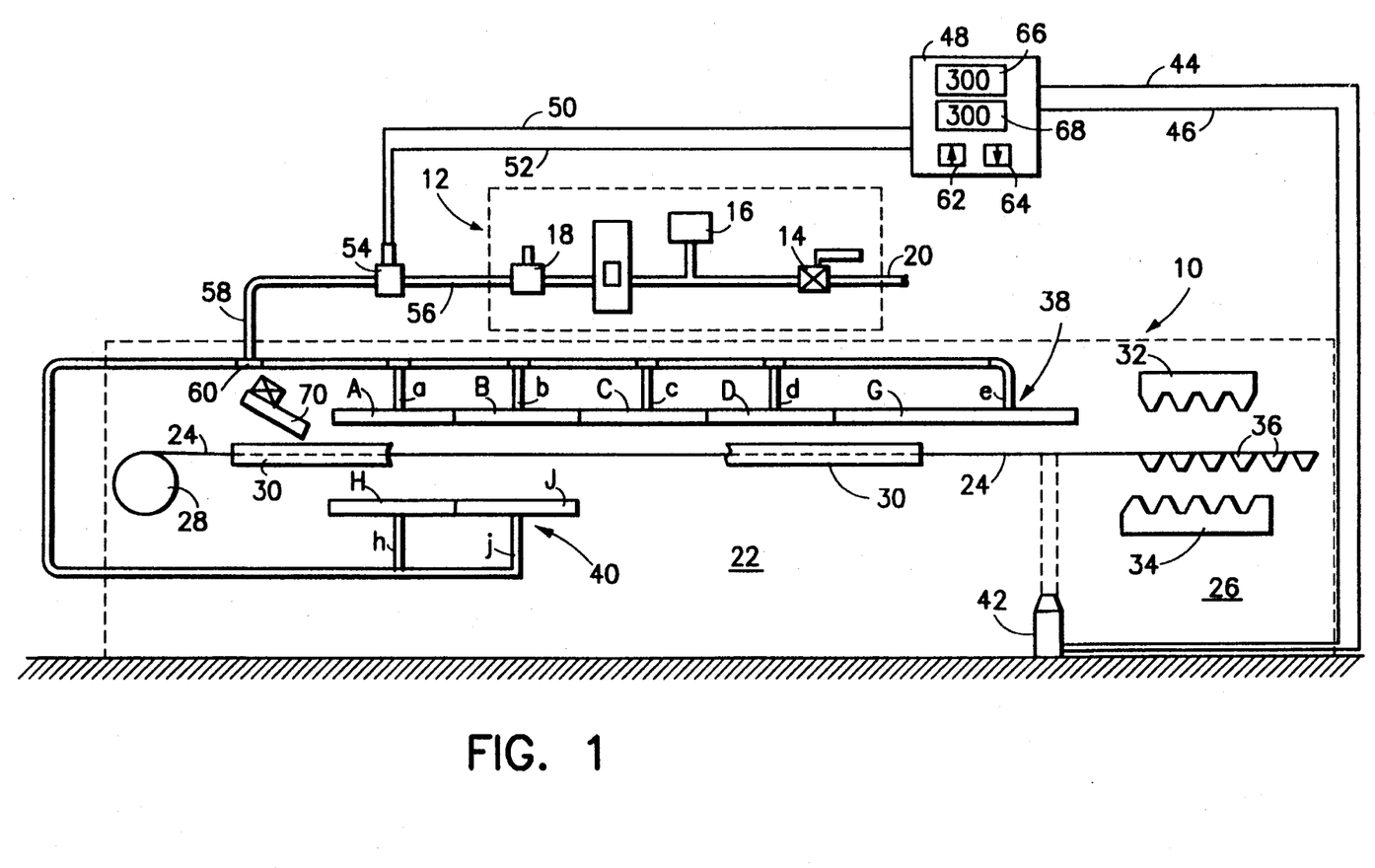
FIG. 1 is a side elevational view of a thermoforming apparatus incorporating gas catalytic heaters according to the invention.
Figure 2:
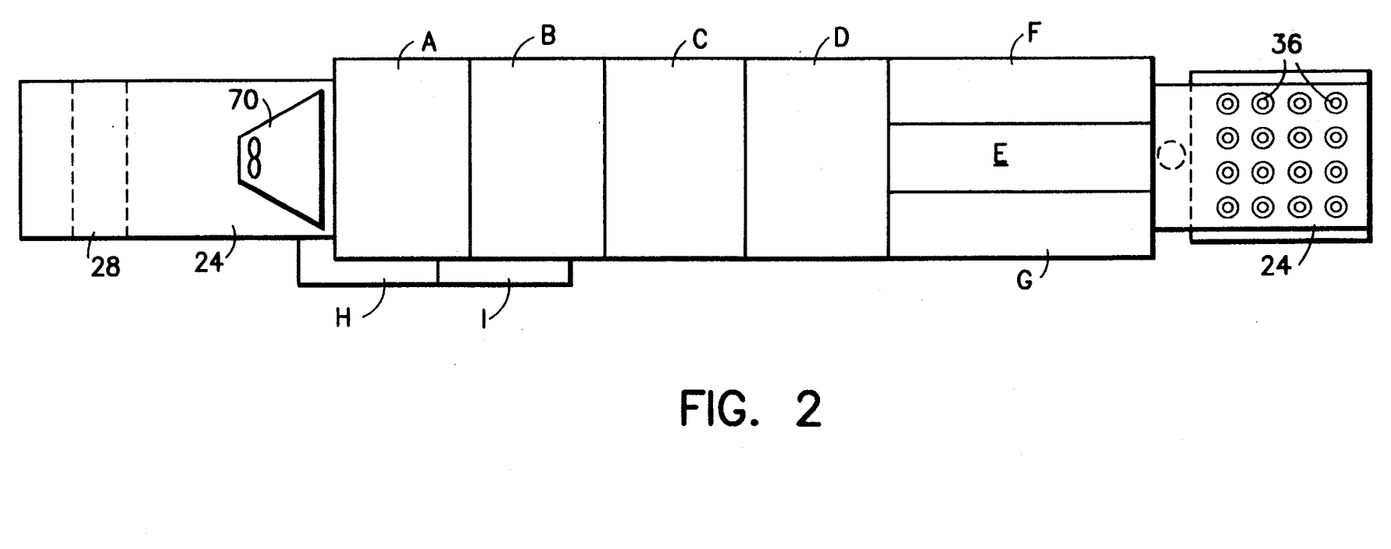
FIG. 2 is a top plan view of the thermoforming apparatus shown in FIG. 1.

Referring now to the drawings and particularly to FIGS. 1 and 2, there is shown a typical thermoforming apparatus for making shaped plastic articles such as plastic coffee cups or dinner plates, for example, according to the invention. Basically, the apparatus includes a roll fed in-line thermoformer generally indicated at 10 and a gas train component system generally indicated at 12.

The gas train component system 12 is of a conventional design and includes a safety shut-off valve 14, a hi-low pressure sensor 16 to detect excessively high or low pressures in the system and, a gas regulator 18, all of which communicate with a gas supply (not shown) via a gas inlet pipe 20.

The thermoformer 10 generally includes a heating section 22 for heating a continuous sheet 24 of thermoplastic material such as styrene or polypropylene, for example, and a molding section 26, the sheet 24 being intermittently fed from a continuous supply roll 28 which is located upstream from both the heating and molding sections 22, 26, respectively. The sheet 24 may be carried through the heating section 22 longitudinally along an elongated horizontal track 30 extending between the supply roll 28 and the molding section 26 using a chain drive (not shown) or like mechanism such as that disclosed, for example, in U.S. Pat. No. 4,954,066 issued to Leary et al. on Sep. 4, 1990. Instead of the supply roll 28, the sheet 24 may also be supplied from a conventional sheet extruder or similar source.

The molding section 26 is of conventional design employing a pair of spaced apart molding plates 32, 34 which when drawn together form the shaped articles such the plastic cups shown at 36. The thermoformer 10 typically operates at between 5 and 30 strokes per minute. Each stroke represents an index move of one mold length, which is typically between about 5 and 50 inches.

Gas fed catalytic heaters are employed as the heat source in the heating section 22 of the thermoformer 10 according to the invention. These catalytic heaters are low intensity, flameless infrared heating devices capable of emitting long wave infrared energy. The catalytic heaters used in the embodiment of the invention illustrated in FIGS. 1 and 2 are substantially flat and rectangular in shape and are arranged horizontally in side by side relation within two separate arrays, namely, an upper array of heaters 38 and a lower array of heaters 40.

As shown particularly in FIG. 1, the sheet 24 of thermoplastic material is continuously drawn between the two arrays of heaters 38, 40 in substantially equi-distant relation from each array to assure uniform heating of the sheet. The sheet 24 is heated for a time sufficient to raise its temperature to a level such that the sheet remains substantially self-supporting but is sufficiently softened to permit its being formed into the desired shapes of the articles to be produced.

The two arrays of heaters 38, 40 may include any number of gas catalytic heaters depending upon the size and application of the thermoforming apparatus, for example. In the illustrated embodiment, the upper array of heaters 38 includes a total of seven heaters, the first four of which heaters A, B, C and D are arranged horizontally in side by side relation along the length of the heating section 22 and the last three of which heaters E, F and G are arranged transversely in side by side relation across the width of the heating section 22 (see FIG. 2). As will become more apparent hereinafter, this arrangement of the catalytic heaters allows for manual adjustment of the heat emission at the downstream end of the heating section 22. The lower array of catalytic heaters 40 may include just two heaters H and J as shown at the upstream end of the heating section 22.

A closed loop temperature control system is also provided according to the invention for controlling the temperature of the sheet 24 during the heating operation. A non-contact infrared temperature sensor 42 is positioned below and spaced from the sheet 24 and senses or measures the temperature of the sheet at a point proximate to the last catalytic heaters E, F and G in the upper array of heaters 38. The sensor 42 produces an electrical signal proportional to the temperature of the sheet 24 just prior to entering the molding section 26 and feeds this signal via the leads 44, 46 to a temperature controller 48.

The temperature controller 48 is of a conventional design employing a digital comparator circuit. The circuit compares the output temperature of the sheet 24 as measured by the sensor 42 against a predetermined or preset temperature, say 300 degrees F, and produces an output signal which is proportional to the difference temperature between the actual processing temperature and the preset temperature. The output signal is then fed via the leads 50, 52 to a gas modulating valve 54 connected to the outlet pipe 56 from the gas train component system 12.

The modulating valve 54 regulates the flow or volume of gas entering the two arrays of catalytic heaters 38, 40, respectively, via the delivery pipe 58. The gas flow is divided at the T-connector 60 proportionally to the number of heaters in each array, part flowing equally to the heaters A through D and the middle heater E (see FIG. 2) in the upper array of heaters 38 via the branch pipes a-e, inclusive, and the remainder equally to the two heaters H and J in the lower array of heaters 40 via the two branch pipes h and j, respectively.

Operation of the closed loop temperature control system according to the invention may be described as follows: The operator presets the desired processing temperature, say 300 degrees F, into the temperature controller 48 using the "up" and "down" buttons 62, 64, the preset processing temperature being shown within the top display 66. The actual processing temperature of the sheet 24 as measured by the sensor 42 appears in the lower display 68. If a difference exists between the actual processing temperature and the preset temperature, then the gas modulating valve 54 will either open or close, in response to the output signal produced by the temperature controller 48, in an amount proportional to the magnitude of the temperature difference and allow more or less gas to enter each heater, thereby controlling the infrared energy emitted by the heaters and absorbed by the sheet 24, raising or lowering its temperature.

It will be noted particularly from FIG. 2 that the catalytic heaters A through D and the middle heater E in the upper array of heaters 38 provide a continuous heating zone arranged longitudinally along the heating section 22 for substantially uniformly heating the sheet 24 of thermoplastic material. The catalytic heaters A through D employed in the illustrated embodiment of the invention have substantially equal surface areas emitting substantially the same infrared energy and are controlled jointly by the same gas modulating valve 54. The middle heater E is connected to the same gas zone as the heaters A-D and will emit the same proportional intensity of infrared energy in that zone. The same is also true, of course, in the case of the heaters H and J in the lower array of heaters 40. The two outer heaters F and G are preferably regulated by a manual valve (not shown) which is controlled separately by the operator. This arrangement allows the operator to manually adjust the heat emission at the downstream end of the heating section 22 and thus "fine tune" the system to assure that the sheet 24 is at the appropriate temperature prior to entering the molding section 26. The heaters F and G may also be controlled via a closed loop infrared temperature sensing system if desired.

It is of course not mandatory to employ the perimeter catalytic heaters F and G in the thermoformer 10 according to the invention. These heaters can be replaced, for example, by a single catalytic heater similar to the heaters A through D. It is also not mandatory to employ catalytic heaters having the same surface area or emission output. Catalytic heaters of different capacities can be used as well. In fact, it is possible to employ other types of heating devices, such as electric infrared heaters, in a thermoformer according to the invention so long as the predominant heating source consists of the catalytic heaters. For example, the two outer heaters F and G in the upper array of heaters 38 could also be electric infrared heaters manually controlled by the operator. It is also possible to employ contact type infrared sensors so long as accurate measurements of the sheet temperature can be attained.

Optionally, a blower 70 may be positioned at the upstream end of the heating section 22, preferably just below the first catalytic heater A as shown in FIGS. 1 and 2. The blower 70 provides a continuous stream of air between the heaters and the sheet 24 for supplying oxygen to promote the catalytic reaction and for removing convected heat developed by the heaters during the heating operation.

Figure 3:
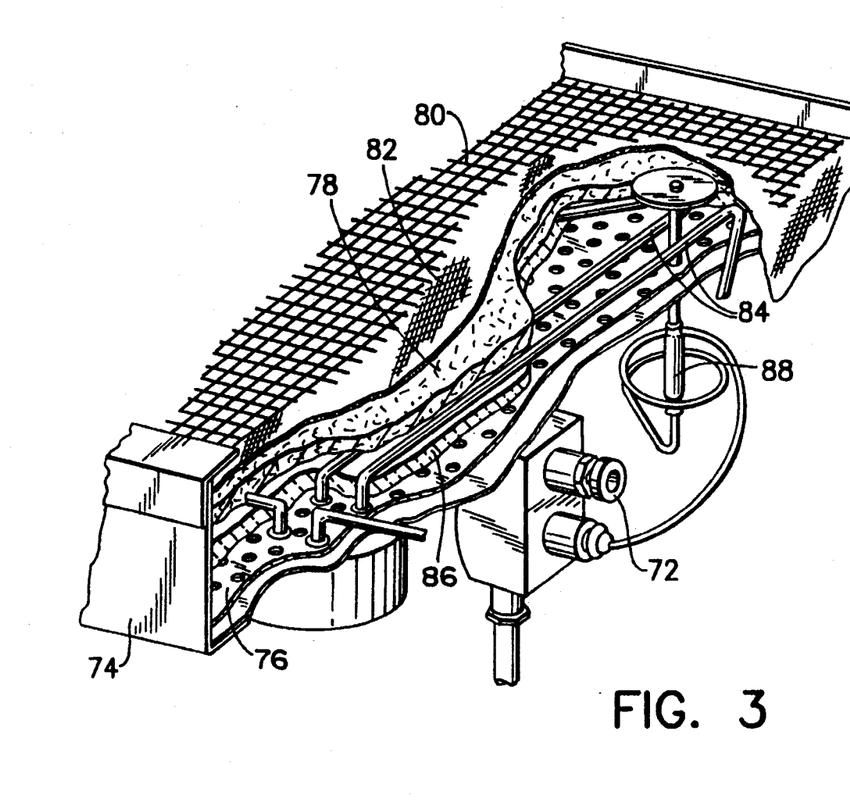
FIG. 3 is a perspective view of a typical gas catalytic heater useful in the apparatus of the invention, part being broken away to show details of its construction.

FIG. 3 shows a typical gas fed catalytic heater useful in the practice of the invention. A hydrogen-rich gas such as natural gas, propane or butane, for example, enters the heater through a safety valve 72 on the backside of a gas-tight pan 74. The gas is dispersed uniformly through a porous plate 76 into contact with the surface of a thin, flat catalyst bed 78 made from a fibrous material, such as silica, for example. The catalyst bed 78 is impregnated with an oxidation catalyst such as platinum, palladium or oxides of chromium, cobalt or copper, for example.

At the same time, oxygen from the atmosphere passes into the catalyst bed 78 through a porous wire mesh screen 80. The screen 80 is supported on top of a porous fiberglass screen 82 at the front side of the heater. At the point where the gas and oxygen meet, oxidation takes place, promoted by a catalytic reaction. This reaction releases the BTU content in the gas in the form of radiant energy. Oxidation takes place at a temperature which is below the flame ignition temperature of the gas.

Initial start up of the heaters requires a preheat period for the catalyst. This is achieved by passing an electrical current through a plurality of heating elements 84 underlying the catalyst bed 78 and separated from the dispersion plate 76 by an insulting pad 86. A contact thermocouple or thermoswitch 88 is connected to the inlet valve 72. The thermoswitch 88 is either normally open and closes on temperature rise or is normally closed and opens on temperature rise. The catalyst bed 78 is preheated for about 15 minutes during start-up. Gas is then allowed to enter the heater via the valve 72 and reacts with the hot catalyst. The electrical current is turned off after about 5 minutes of reaction time and the reaction is allowed to proceed indefinitely or until the gas supply is terminated. For a more detailed description of a gas catalytic heater, reference is made to U.S. Pat. No. 3,784,353 issued to Chapurin on Jan. 8, 1974.

Catalytic type infrared heaters offer a number of unexpected advantages when used in the thermoforming process. One principal advantage is that the catalytic heaters emit long wave infrared energy which is readily absorbed by most plastic materials. The catalytic reaction that takes place in the catalytic heater varies from a low of about 650 degrees F (low fire) to a high of about 800 degrees F (high fire). At these temperatures, the peak wave length of the infrared energy emitted from the catalytic heater ranges from about 4.5 to about 9.0 microns.

Figure 4:
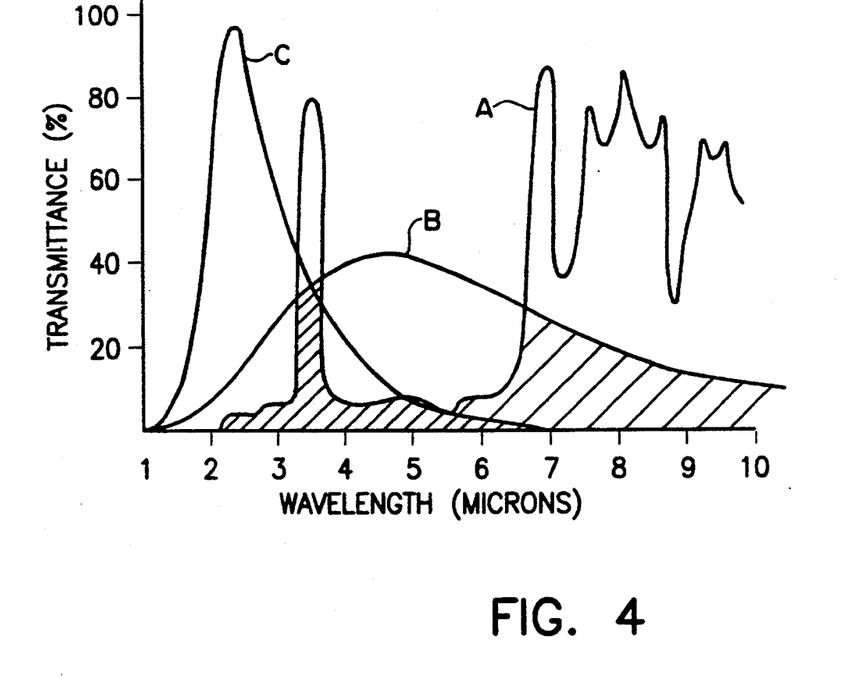
FIG. 4 is a graph comparing the spectral emission of both electric and catalytic heaters relative to the absorption of typical thermoplastic materials.

As seen from the graph of FIG. 4, the main absorption range of most plastic materials (Curve A) is between about 6 and 10 microns, with a sharp absorption spike at about 3.7 microns. Thus it will be seen that plastic materials absorb the longer wave length infrared energy (Curve B) emitted by catalytic heaters far more efficiently than the shorter wave length infrared energy (Curve C) emitted by electric heaters which also operate at higher temperatures than do the catalytic heaters. Although infrared energy having a wave length of from about 3 to 4 microns emitted from either an electric or catalytic heater is absorbed about equally (see area under both curves B and C), very little if any of the shorter wave length infrared emitted by the electric heaters is absorbed by the plastic materials at wave lengths above about 6 microns.

Electric infrared heaters employing calrod, quartz and nichrome wire heating elements, for example, glow red and emit short wave infrared energy with peak emissions in the range of 1 to 3 microns. Catalytic heaters, on the other hand, emit infrared energy in the invisible infrared range of from about 4.5 to about 9.0 microns. Thus as compared to electric heaters, catalytic type heaters produce a uniform, low intensity, nonglowing heat and emit a high field of energy that is optimally absorbed throughout the thickness of the plastic material.

Another important advantage derived from the use of gas catalytic heaters as opposed to electric heaters is that the catalytic reaction that takes place is very efficient and converts the gas BTU input into mostly infrared energy with very little convective heat being developed. Actually, the ratio is about 80 percent infrared to about 20 percent convection. Since most of the heating is produced by infrared energy, it is now possible with the catalytic heaters to effectively employ a closed loop temperature control system such as described hereinabove without the unpredictable effects caused by convective heat.

With gas catalytic heaters, the level of infrared radiation is determined by the gas pressure or volume of gas fed to the heaters and this can now be easily regulated by a closed loop control system. The closed loop system produces a continuous even flow of gas to the heaters as opposed to the rather inefficient on/off cycle of percentage timers.

Figure 5:
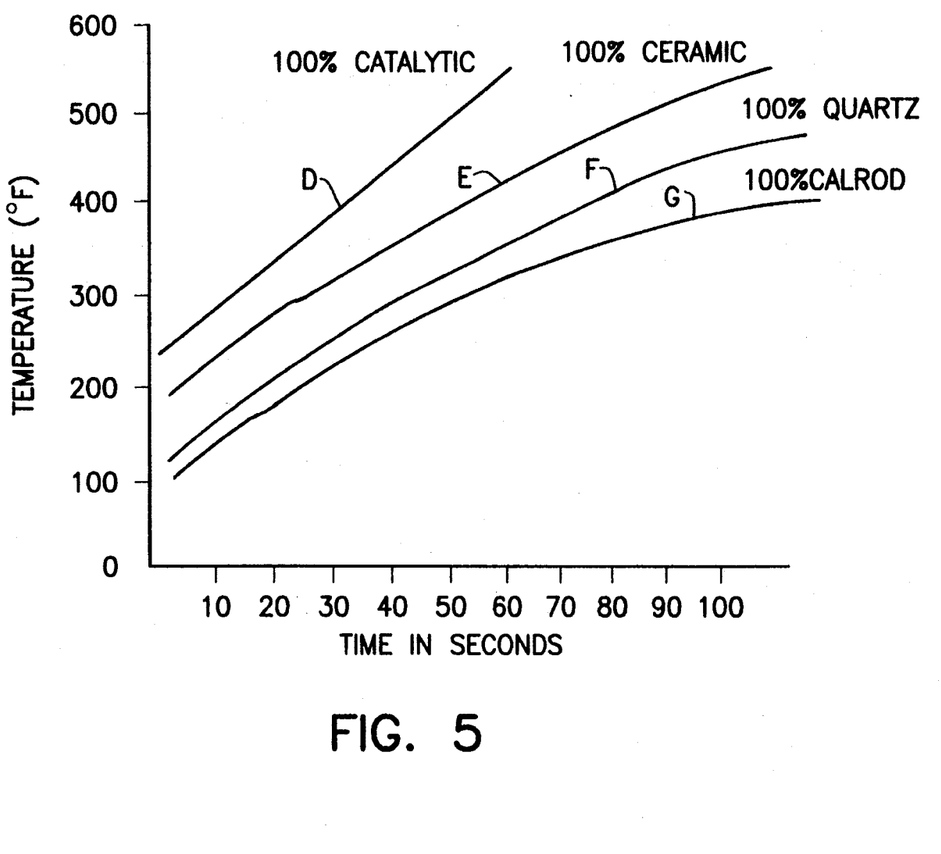
FIG. 5 is a graph comparing the heating rate between catalytic and electric heaters employing different types of heating elements.

FIG. 5 shows a comparison of heating times for electrical elements and the catalytic heaters. The electrical heating elements provide a "line source" of heat, whereas the catalytic heaters provide a very even heat source over the entire area of the heater. This results in a dramatic difference of heating times for the catalytic heater (Curve D) verses the heating times for conventional heating elements such as ceramic (Curve E), quartz (Curve F) and calrod (Curve G). It will be seen, for example, that sheets of thermoplastic material can be heated to temperatures approaching 400 degrees F within the relatively short period of about 30 seconds whereas a similar sheet of thermoplastic material heated by a calrod heating element will require about 100 seconds to achieve the same temperature level. The heating times required for heating a sheet of thermoplastic material to about the same temperature for ceramic and quartz elements are considerable less than the calrod element, but in either case the shortness of heating time does not approach that of the catalytic heater.

Perhaps the most important advantage derived from the use of gas catalytic heaters in the thermoforming process is that of safety. As noted hereinabove, electric infrared heaters operate at fairly high temperatures and will ignite most flammable materials upon contact. Thus, if a sheet of thermoplastic material should "drop" during the heating process while in the thermoformer, the plastic will fall directly onto the heaters, resulting in an immediate fire. However, when the catalytic heaters are employed, there is no danger of fire since the catalytic heaters are flameless and operate at lower temperatures.

The ecological and economical advantages of gas as an energy source for industry have long been established. The thermoforming process and apparatus of the invention enables producers of plastic articles to take full advantage of the benefits of gas without the risks. By using either a manual or automatic operating system, together with a choice of controlling a heating zone by simple manual regulation or using gas modulation via digital control units, systems can be readily tailored to meet specific requirements. Since the temperature at any point on the entire emitting surface of a gas catalytic heater is less than half that of a single electric infrared emitter, the need for zoning is substantially reduced. Zone regulation can be limited to a perimeter and central area as described hereinabove, or simply to individual heaters within an array. Within each zone, the level of energy produced is regulated solely by gas pressure and hence gas volume from the gas supply.

Thus, the invention provides a novel thermoforming apparatus for making shaped plastic articles using a gas catalytic heater as a heat source. The use of gas catalytic heaters in the thermoforming of shaped articles represents a significant improvement over prior processes and apparatus using electric infrared heaters. Catalytic heaters are low intensity, long wave infrared emitters. Electric heaters, on the other hand, are high intensity, short wave emitters. By incorporating the gas catalytic heaters in a typical roll fed in-line thermoforming apparatus, together with a closed loop temperature control system, the variables inherent in the use of electric heaters are effectively eliminated.

What is claimed is:

1. An apparatus for thermoforming shaped articles comprising, in combination:
   a supply of thermoplastic sheet material;
   a heating section for heating said thermoplastic sheet material to a temperature level such that said sheet material remains substantially self supporting but is sufficiently softened to permit said sheet material to be formed into desired shapes, said heating section containing a gas catalytic heater comprising a gas permeable layer containing an oxidation catalyst and means for introducing a hydrocarbon-rich gas into contact with one side of said layer and for exposing the opposite side of said layer to an oxygen-containing gaseous medium;
   a mold for forming the softened thermoplastic sheet material into the desired shape of said articles;
   means for feeding said thermoplastic sheet material from said supply through said heating section and to said mold;
   a sensor for measuring the actual temperature of said thermoplastic sheet material while passing through said heating section; and
   means for varying the pressure of the gas fed to said catalytic heater in response to changes in the temperature of said thermoplastic sheet material as measured by said sensor thereby controlling the amount of infrared energy emitted by said heater and absorbed by said sheet material.

2. An apparatus for thermoforming shaped articles according to claim 1 further including means for comparing the actual temperature of said thermoplastic sheet against a preset temperature and for producing a signal proportional to the difference between said actual temperature and said preset temperature.

3. An apparatus for thermoforming shaped articles according to claim 1 wherein the means for varying said gas pressure comprises a modulating valve connected between said catalytic heater and a gas supply.

4. An apparatus for thermoforming shaped articles comprising, in combination:
   a supply of thermoplastic sheet material;
   a heating section for heating said thermoplastic sheet material to a temperature level such that said sheet material remains substantially self supporting but is sufficiently softened to permit said sheet material to be formed into desired shapes, said heating section containing a plurality of gas catalytic heaters arranged in both upper and lower arrays of heaters connected in side by side relation along substantially the length of said heating section wherein each of said gas catalytic heaters comprises a gas permeable layer containing an oxidation catalyst and means for introducing a hydrocarbon-rich gas into contact with one side of said layer and for exposing the opposite side of said layer to an oxygen-containing gaseous medium;
   a mold for forming the softened thermoplastic sheet material into the desired shape of said articles;
   means for feeding said thermoplastic sheet material from said supply through said heating section between said upper and lower arrays of heaters and to said mold;

a non-contact infrared sensor for measuring the actual temperature of said thermoplastic sheet material while passing through said heating zone, said sensor being located adjacent to the last heater in one of said arrays of heaters along the length of said heating section;

a comparator means for comparing the actual temperature of said thermoplastic sheet material as measured by said sensor against a preset temperature and for producing a signal proportional to the difference between said actual temperature and said preset temperature; and means for varying the pressure of the gas fed to said catalytic heater in response to said signal thereby controlling the amount of infrared energy emitted by said heater and absorbed by said sheet material.

5. An apparatus for thermoforming shaped articles according to claim 4 wherein the means for varying said gas pressure comprises a modulating valve connected between said catalytic heater and a gas supply.

6. An apparatus for thermoforming shaped articles according to claim 4 further including means for directing a stream of air between said thermoplastic sheet material and at least one of said arrays of heaters.

7. An apparatus for thermoforming shaped articles comprising, in combination:

a supply roll of thermoplastic sheet material;
a gas supply;
a heating section for heating said thermoplastic sheet material to a temperature level such that said sheet material remains substantially self supporting but is sufficiently softened to permit said sheet material to be formed into desired shapes, said heating section containing a plurality of gas catalytic heaters arranged in both upper and lower arrays of heaters connected in side by side relation along substantially the length of said heating section, at least one of said arrays of heaters including separate heating zones at a location farthest from said supply roll comprising a middle heater and two perimeter heaters, wherein each of said gas catalytic heaters comprises a gas permeable layer containing an oxidation catalyst and means for introducing a hydrocarbon-rich gas into contact with one side of said layer and for exposing the opposite side of said layer to an oxygen-containing gaseous medium;

a mold for forming the softened thermoplastic sheet into the desired shape of said articles;

means for feeding said thermoplastic sheet material from said supply roll through said heating section between said upper and lower arrays of heaters and to said mold;

a non-contact infrared sensor for measuring the actual temperature of said thermoplastic sheet while passing through said heating zone, said sensor being located adjacent to said heater including said separate heating zones;

a comparator means for comparing the actual temperature of said thermoplastic sheet as measured by said sensor against a preset temperature and for producing a signal proportional to the difference between said actual temperature and said preset temperature;

a modulating valve connected between said arrays of catalytic heaters and said gas supply for varying the pressure of the gas fed to said side by side catalytic heaters and said middle heater in response to said signal thereby controlling the amount of infrared energy emitted by said heaters and absorbed by said sheet;

means for manually controlling the infrared heat emitted from said perimeter heaters; and means for directing a stream of air between said thermoplastic sheet material and at least one of said arrays of heaters for removing convective heat produced by said heaters.

8. In an apparatus for thermoforming shaped plastic articles including a heating section containing a plurality of infrared heaters arranged in spaced apart relation from a sheet of thermoplastic material for heating the sheet to its softening temperature as said sheet passes through said heating section, said infrared heaters producing both infrared and convective heat, a mold for shaping the softened sheet to the desired shape of said articles and a closed loop temperature control system including an infrared sensor for measuring the actual temperature of said sheet and a temperature control means for producing a signal proportional to the difference between said actual temperature and a preset temperature: the improvement comprising means for reducing said convective heat to a minimum level of about twenty percent or less of the total heat developed by said heaters, the remainder being predominantly infrared heat; said improvement comprising the combination of gas fed catalytic heaters as said infrared heaters, said gas catalytic heaters comprising a gas permeable layer containing an oxidation catalyst and inlet means for introducing a hydrocarbon-rich gas into contact with said layer, and a gas modulating valve communicating between a source of said hydrocarbon-rich gas and said inlet means, said gas modulating valve being operable to increase or decrease the volume of said gas supplied to said inlet means in response to changes in said signal, thereby controlling the amount of infrared energy emitted by said catalytic heaters and absorbed by said sheet.

9. An apparatus for thermoforming shaped articles according to claim 8 wherein said heating section includes a plurality of said gas catalytic heaters connected in side by side relation along the length of said heating section.

10. An apparatus for thermoforming shaped articles according to claim 9 wherein said gas catalytic heaters are arranged in both upper and lower arrays of heaters and wherein said thermoplastic sheet is fed between said arrays of heaters.

11. An apparatus for thermoforming shaped articles according to claim 10 wherein at least one of said arrays of heaters includes separate heating zones comprising a middle heater and two perimeter heaters.

12. An apparatus for thermoforming shaped articles according to claim 10 wherein said sensor is located adjacent to the last heater along the length of said heating section.

13. An apparatus for thermoforming shaped articles according to claim 12 wherein said sensor is a non-contact infrared sensor.

14. An apparatus for thermoforming shaped articles according to claim 10 further including means for directing a stream of air between said thermoplastic sheet and said arrays of heaters.

15. An apparatus for thermoforming shaped articles comprising, in combination:

a supply of thermoplastic sheet material;

a heating section for heating said thermoplastic sheet material to a temperature level such that said sheet material remains substantially self supporting but is sufficiently softened to permit said sheet material to be formed into desired shapes, said heating section containing a plurality of gas catalytic heaters arranged in both upper and lower arrays of heaters connected in side by side relation along substantially the length of said heating section wherein each of said gas catalytic heaters comprises a gas permeable layer containing an oxidation catalyst and means for introducing a hydrocarbon-rich gas into contact with one side of said layer and for exposing the opposite side of said layer to an oxygen-containing gaseous medium;

a mold for forming the softened thermoplastic sheet material into the desired shape of said articles;

means for feeding said thermoplastic sheet material from said supply through said heating section between said upper and lower arrays of heaters and to said mold;

a non-contact infrared sensor for measuring the actual temperature of said thermoplastic sheet material while passing through said heating zone, said sensor being located adjacent to the last heater in one of said arrays of heaters along the length of said heating section;

a comparator means for comparing the actual temperature of said thermoplastic sheet material as measured by said sensor against a preset temperature and for producing a signal proportional to the difference between said actual temperature and said preset temperature;

means for varying the pressure of the gas fed to said catalytic heater in response to said signal thereby controlling the amount of infrared energy emitted by said heater and absorbed by said sheet material; and means for directing a stream of air between said thermoplastic sheet material and at least one of said arrays of heaters for removing convective heat produced by said heaters.

* * * * *